US012669186B2

(12) United States Patent
Noll

(10) Patent No.: US 12,669,186 B2
(45) Date of Patent: Jun. 30, 2026

(54) FLUID VALVE

(71) Applicant: Vitesco Technologies GmbH, Regensburg (DE)

(72) Inventor: Michael Noll, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 299 days.

(21) Appl. No.: 17/638,436

(22) PCT Filed: Jul. 21, 2020

(86) PCT No.: PCT/EP2020/070549
§ 371 (c)(1),
(2) Date: Feb. 25, 2022

(87) PCT Pub. No.: WO2021/037442
PCT Pub. Date: Mar. 4, 2021

(65) Prior Publication Data
US 2022/0290765 A1 Sep. 15, 2022

(30) Foreign Application Priority Data

Aug. 27, 2019 (DE) ...................... 10 2019 212 869.6

(51) Int. Cl.
*F16K 11/085* (2006.01)
*F16K 11/087* (2006.01)
*F16K 27/06* (2006.01)

(52) U.S. Cl.
CPC ...... *F16K 11/0853* (2013.01); *F16K 11/0873* (2013.01); *F16K 27/065* (2013.01); *F16K 27/067* (2013.01)

(58) Field of Classification Search
CPC ............. F16K 11/0853; F16K 11/0873; F16K 27/065; F16K 27/067
See application file for complete search history.

(56) References Cited

U.S. PATENT DOCUMENTS 2,944,566 A * 7/1960 Modrin .................. F16K 5/0471
137/625.22
3,563,265 A * 2/1971 Graham ................ F16K 5/0626
251/315.1

(Continued)

FOREIGN PATENT DOCUMENTS

CN 101230929 7/2008
CN 102985731 3/2013

(Continued)

OTHER PUBLICATIONS

Office Action of the corresponding German Patent Application No. 10 2019 212 869.6.

(Continued)

*Primary Examiner* — Craig M Schneider
*Assistant Examiner* — Christopher D Ballman
(74) *Attorney, Agent, or Firm* — COZEN O'CONNOR

(57) ABSTRACT

A fluid valve has a cavity in which an actuator is accommodated, the cavity has a first inflow opening and a first outflow opening. The actuator has a through-passage with a first actuator opening and a second actuator opening, in one actuator position, the first actuator opening is situated opposite the first inflow opening and the second actuator opening is situated opposite the first outflow opening, and in one different actuator position, the first actuator opening is not situated opposite the first inflow opening and/or the second actuator opening is not situated opposite the first outflow opening, and a cross-sectional area of the first actuator opening is greater than a cross-sectional area of the first inflow opening, and/or a cross-sectional area of the first outflow opening is greater than a cross-sectional area of the second actuator opening.

13 Claims, 2 Drawing Sheets

(56) References Cited

U.S. PATENT DOCUMENTS

| | | | | |
|---|---|---|---|---|
| 3,985,152 | A * | 10/1976 | Albanese | F16K 27/065 |
| | | | | 251/309 |
| 4,964,436 | A * | 10/1990 | Hein | F16K 11/0873 |
| | | | | 251/174 |
| 5,246,200 | A * | 9/1993 | Barker | F16K 27/067 |
| | | | | 251/315.01 |
| 5,533,549 | A * | 7/1996 | Sherman | F16K 27/067 |
| | | | | 137/557 |
| 5,617,815 | A * | 4/1997 | Spies | F16K 11/076 |
| | | | | 123/41.1 |
| 5,686,678 | A | 11/1997 | Greenhoe | |
| 5,690,135 | A * | 11/1997 | Dehais | F16K 11/0873 |
| | | | | 62/401 |
| 5,911,405 | A * | 6/1999 | Korczynski, Jr. | F16K 27/067 |
| | | | | 251/315.11 |
| 9,686,907 | B2 * | 6/2017 | Hui | B65G 53/56 |
| 2015/0114489 | A1 * | 4/2015 | Hayashi | F16K 5/04 |
| | | | | 251/309 |
| 2020/0011437 | A1 | 1/2020 | Lin et al. | |
| 2020/0109820 | A1 | 4/2020 | Ikeda | |

FOREIGN PATENT DOCUMENTS

| | | |
|---|---|---|
| CN | 106015649 | 10/2016 |
| CN | 108119672 | 6/2018 |
| CN | 110043692 | 7/2019 |
| DE | 7522188 | 10/1975 |
| DE | 10014555 | 10/2001 |
| GB | 516614 | 12/1939 |
| GB | 516906 A | 1/1940 |
| GB | 720529 | 12/1954 |
| JP | 2002228025 A | 8/2002 |
| WO | WO 2012005134 | 1/2012 |

OTHER PUBLICATIONS

Office Action dated Mar. 30, 2024 issued in Chinese Patent Application No. 202080053858.8.

European Office Action dated Mar. 27, 2024 issued in European Patent Application No. 20745142.8.

Office Action (and an English translation) dated Sep. 4, 2024, issued in German Patent Application No. 10 2019 212 869.6, 18 pages.

* cited by examiner

FLUID VALVE

CROSS REFERENCE TO RELATED APPLICATIONS

This is a U.S. national stage of Application No. PCT/EP2020/070549 filed Jul. 21, 2020. Priority is claimed on German Application No. DE 10 2019 212 869.6 filed Aug. 27, 2019 the content of which is incorporated herein by reference.

BACKGROUND OF THE INVENTION

1. Field of the Invention

The present disclosure relates to a fluid valve for a temperature-control system and/or motor vehicle, to a fluid system, in particular a temperature-control system, having the fluid valve, to a motor vehicle having the fluid valve, in particular the fluid system, and to a method for operating the fluid valve.

SUMMARY OF THE INVENTION

It is an object of one aspect of the present invention to improve a fluid valve or fluid system.

One aspect of the invention is a fluid system, in particular a temperature-control system, having one or more fluid valves described herein, a motor vehicle having one or more fluid valves described herein, in particular at least one fluid system described herein, and a method for operating a fluid valve described herein, in particular a fluid system described herein, under protection.

According to one aspect of the present invention, a fluid valve has a cavity in which a single- or multi-part actuator is accommodated, in particular mounted, in a movable, in particular rotatable, manner.

The fluid valve is, according to one aspect, a control or regulating valve and/or a fluid valve for a temperature-control system, in particular for cooling and/or heating, and/or for a motor vehicle or a fluid valve of a fluid system, in particular a temperature-control system and/or motor vehicle, that is to say in particular a fluid, in particular control or regulating, valve of a motor vehicle fluid, in particular temperature-control, system, in particular for cooling and/or heating a motor and/or passenger compartment of the motor vehicle. In one aspect, the motor vehicle is an electric vehicle or hybrid vehicle. The fluid valve is, in one embodiment, flowed through by liquid or is provided, in particular configured, for this purpose, or is used for this purpose, that is to say, in one aspect, is a liquid (control or regulating) valve.

The present disclosure is particularly suitable for this purpose owing to the structural, thermodynamic, and/or in particular fluid dynamic boundary conditions.

In one aspect of the present invention, the fluid valve has a single- or multi-part housing which, for its part, has the cavity. The actuator and the cavity have lateral surfaces which, in one aspect, are situated opposite one another and which, in one aspect, are ring-like or, with respect to the (an) axis of rotation of the actuator, rotationally symmetrical, in particular cylindrical or partially spherical, and in one refinement the cavity has an inner lateral surface and the actuator has an outer lateral surface.

According to one aspect of the present invention, the cavity, in particular the (inner) lateral surface thereof, has a first single- or multi-channel inflow opening and a first single- or multi-channel outflow opening, and the actuator, in particular the (outer) lateral surface thereof, has at least one single- or multi-channel first actuator opening and one single- or multi-channel second actuator opening, which are connected to one another (in terms of flow) by a single- or multi-channel through-passage.

According to one aspect of the present invention, in at least one actuator position, in particular rotational position, of the actuator, the first actuator opening is situated opposite the first inflow opening and the second actuator opening is situated opposite the first outflow opening, so that, during operation, fluid flows from the first inflow opening into the first actuator opening (via a gap), through the through-passage, and from the second actuator opening into the first outflow opening (via a gap), and in at least one different actuator position, in particular different rotational position, of the actuator, the first actuator opening is not situated opposite the first inflow opening and/or the second actuator opening is not situated opposite the first outflow opening. In one aspect, in the one actuator position, the first inflow opening and the first outflow opening are connected to one another (in terms of flow) via or by the through-passage, and in the at least one different actuator position, the first inflow opening and the first outflow opening are not connected to one another (in terms of flow) via or by the through-passage.

According to one aspect of the present invention, a cross-sectional area of the first actuator opening is greater than a cross-sectional area of the first inflow opening, in one aspect by at least 0.1%, in particular at least 1%, and/or at least 1 mm². Additionally or alternatively, according to one aspect of the present invention, a cross-sectional area of the first outflow opening is greater than a cross-sectional area of the second actuator opening, in one aspect by at least 0.1%, in particular at least 1%, and/or at least 1 mm².

According to one aspect of the present invention, as a result of this cross-sectional enlargement between/from the first inflow opening and/into the first actuator opening(s) and/or between/from the second actuator opening and/into the first outflow opening(s), it is the case that, in particular by way of swirling induced in this way, suction into the first actuator opening or outflow opening is generated. Consequently, in one aspect, leakage in or into a gap between cavity and actuator, in particular their lateral surfaces situated opposite one another, is reduced. In this way, in one embodiment, it is possible for a contact seal to be dispensed with or for the contact pressure thereof to be reduced, and thus in particular for a force or a torque for adjusting the fluid valve or actuating element to advantageously be reduced.

According to one aspect of the present invention, the cavity, in particular the (inner) lateral surface thereof, has a second single-or multi-channel outflow opening.

According to one aspect of the present invention, in at least one actuator position, in particular rotational position, of the actuator, the second actuator opening is situated opposite an inflow opening, in particular of the cavity, in particular of the (inner) lateral surface thereof, in particular the first inflow opening, a second inflow opening or a different inflow opening, and the first actuator opening is situated opposite the second outflow opening, so that, during operation, fluid flows from this inflow opening into the second actuator opening, through the through-passage, and from the first actuator opening into the second outflow opening, and in at least one different actuator position, in particular different rotational position, of the actuator, the second actuator opening is not situated opposite this inflow opening and/or the first actuator opening is not situated opposite the second outflow opening, wherein the cross-sectional area of the second actuator opening is greater than a or the cross-sectional area of this inflow opening, in one aspect by at least 0.1%, in particular at least 1%, and/or at least 1 mm², and/or a cross-sectional area of the second outflow opening is greater than the cross-sectional area of the first actuator opening, in one aspect by at least 0.1%, in particular at least 1%, and/or at least 1 mm².

Additionally or alternatively, according to one aspect of the present invention, in at least one actuator position, in particular rotational position, of the actuator, the first actuator opening is situated opposite an inflow opening, in particular of the cavity, in particular of the (inner) lateral surface thereof, in particular the first inflow opening, a second inflow opening or a different inflow opening, and the second actuator opening is situated opposite the second outflow opening, so that, during operation, fluid flows from this inflow opening into the first actuator opening, through the through-passage, and from the second actuator opening into the second outflow opening, and in at least one different actuator position, in particular different rotational position, of the actuator, the first actuator opening is not situated opposite this inflow opening and/or the second actuator opening is not situated opposite the second outflow opening, wherein the cross-sectional area of the first actuator opening is greater than a or the cross-sectional area of this inflow opening, in one aspect by at least 0.1%, in particular at least 1%, and/or at least 1 mm², and/or a or the cross-sectional area of the second outflow opening is greater than the cross-sectional area of the second actuator opening, in one aspect by at least 0.1%, in particular at least 1%, and/or at least 1 mm².

According to one aspect of the present invention, the cavity, in particular the (inner) lateral surface thereof, has a second single-or multi-channel inflow opening.

According to one aspect of the present invention, in at least one actuator position, in particular rotational position, of the actuator, the second actuator opening is situated opposite the second inflow opening and the first actuator opening is situated opposite an outflow opening, in particular of the cavity, in particular of the (inner) lateral surface thereof, in particular the first outflow opening, the second outflow opening or a different outflow opening, so that, during operation, fluid flows from the second inflow opening into the second actuator opening, through the through-passage, and from the first actuator opening into this outflow opening, and in at least one different actuator position, in particular different rotational position, of the actuator, the second actuator opening is not situated opposite the second inflow opening and/or the first actuator opening is not situated opposite this outflow opening, wherein the cross-sectional area of the second actuator opening is greater than a or the cross-sectional area of the second inflow opening, in one embodiment by at least 0.1%, in particular at least 1%, and/or at least 1 mm², and/or a or the cross-sectional area of this outflow opening is greater than the cross-sectional area of the first actuator opening, in one aspect by at least 0.1%, in particular at least 1%, and/or at least 1 mm².

According to one aspect of the present invention, in at least one actuator position, in particular rotational position, of the actuator, the first actuator opening is situated opposite the second inflow opening and the second actuator opening is situated opposite an outflow opening, in particular of the cavity, in particular of the (inner) lateral surface thereof, in particular the first outflow opening, the second outflow opening or a different outflow opening, so that, during operation, fluid flows from the second inflow opening into the first actuator opening, through the through-passage, and from the second actuator opening into this outflow opening, and in at least one different actuator position, in particular different rotational position, of the actuator, the first actuator opening is not situated opposite the second inflow opening and/or the second actuator opening is not situated opposite this outflow opening, wherein the cross-sectional area of the first actuator opening is greater than a or the cross-sectional area of the second inflow opening, in one embodiment by at least 0.1%, in particular at least 1%, and/or at least 1 mm², and/or a or the cross-sectional area of this outflow opening is greater than the cross-sectional area of the second actuator opening, in one embodiment by at least 0.1%, in particular at least 1%, and/or at least 1 mm².

According to one aspect of the present invention, the actuator has at least one single- or multi-channel further through-passage with two single- or multi-channel actuator openings, in particular of the (outer) lateral surface thereof, which are connected to one another (in terms of flow) by this further through-passage and, in the present case, are referred to as first and second further actuator openings.

According to one aspect of the present invention, in at least one actuator position, in particular rotational position, of the actuator, the first further actuator opening is situated opposite an inflow opening, in particular of the cavity, in particular of the (inner) lateral surface thereof, in particular the first inflow opening, the second inflow opening or a different inflow opening, and the second further actuator opening is situated opposite an outflow opening, in particular of the cavity, in particular of the (inner) lateral surface thereof, in particular the first outflow opening, the second outflow opening or a different outflow opening, so that, during operation, fluid flows from this inflow opening into the first further actuator opening, through the further through-passage, and from the second further actuator opening into this outflow opening, and in at least one different actuator position, in particular different rotational position, of the actuator, the first further actuator opening is not situated opposite this inflow opening and/or the second further actuator opening is not situated opposite this outflow opening, wherein a cross-sectional area of the first further actuator opening is greater than a or the cross-sectional area of this inflow opening, in one aspect by at least 0.1%, in particular at least 1%, and/or at least 1 mm², and/or a or the cross-sectional area of this outflow opening is greater than a cross-sectional area of the second further actuator opening, in one aspect by at least 0.1%, in particular at least 1%, and/or at least 1 mm².

According to one aspect of the present invention, in at least one actuator position, in particular rotational position, of the actuator, the second further actuator opening is situated opposite an inflow opening, in particular of the cavity, in particular of the (inner) lateral surface thereof, in particular the first inflow opening, the second inflow opening or a different inflow opening, and the first further actuator opening is situated opposite an outflow opening, in particular of the cavity, in particular of the (inner) lateral surface thereof, in particular the first outflow opening, the second outflow opening or a different outflow opening, so that, during operation, fluid flows from this inflow opening into the second further actuator opening, through the further through-passage, and from the first further actuator opening into this outflow opening, and in at least one different actuator position, in particular different rotational position, of the actuator, the second further actuator opening is not situated opposite this inflow opening and/or the first further actuator opening is not situated opposite this outflow opening, wherein a or the cross-sectional area of the second further actuator opening is greater than a or the cross-sectional area of this inflow opening, in one embodiment by at least 0.1%, in particular at least 1%, and/or at least 1 mm$^2$, and/or a or the cross-sectional area of this outflow opening is greater than a or the cross-sectional area of the first further actuator opening, in one embodiment by at least 0.1%, in particular at least 1%, and/or at least 1 mm$^2$.

According to one aspect of the present invention, the cross-sectional area of at least one, in one refinement each, actuator opening of at least one, in one refinement each, through-passage of the actuator that, in at least one actuator position, is situated opposite an inflow opening (of the cavity or of the (inner) lateral surface thereof) is greater than the cross-sectional area of this inflow opening, by at least 0.1%, in particular at least 1%, and/or at least 1 mm$^2$ and/or for each inflow opening of the cavity or of the (inner) lateral surface thereof. According to one aspect of the present invention, the cross-sectional area of at least one, in one refinement each, actuator opening of at least one, in one refinement each, through-passage of the actuator that, in at least one actuator position, is situated opposite an outflow opening (of the cavity or of the (inner) lateral surface thereof) is less than the cross-sectional area of this outflow opening, by at least 0.1%, in particular at least 1%, and/or at least 1 mm$^2$ and/or for each outflow opening of the cavity or of the (inner) lateral surface thereof.

According to one aspect of the present invention, as a result of this (these) cross-sectional enlargement(s) between/from the respective inflow opening and the/into the actuator opening situated opposite thereto and/or between/from the respective actuator opening and the/into the outflow opening situated opposite thereto, it is the case that, in particular by way of swirling induced in this way, suction into the actuator opening situated opposite the inflow opening and/or from the actuator opening into the outflow opening situated opposite thereto is generated. Consequently, in each case, in particular in combination, leakage in or into the gap between cavity and actuator, in particular their lateral surfaces situated opposite one another, is reduced. In this way, in one embodiment, it is possible for a contact seal to be dispensed with or for the contact pressure thereof to be reduced, and thus in particular for a force or a torque for adjusting the fluid valve or actuating element to advantageously be reduced.

For this reason in particular, according to one aspect of the present invention, the fluid valve has a contact seal-free or -less, in one refinement seal-free or seal-less, gap, in particular (contact) seal-free or -less annular gap, between the first inflow opening and the first outflow opening and/or between the first inflow opening and the second outflow opening and/or between the second inflow opening and the first outflow opening and/or between the second inflow opening and the second outflow opening and/or between the first and second inflow opening and/or between the first and second outflow opening, in one refinement between all those inflow openings and outflow openings of the cavity opposite which one of the actuator openings is situated in at least one rotational position.

According to one aspect of the present invention, for a (first) pairing of an actuator opening and an inflow or outflow opening opposite which this actuator opening is situated in an actuator position, a difference between the cross-sectional area of this actuator opening and the cross-sectional area of this inflow or outflow opening has a first difference value, and a flow resistance between this inflow or outflow opening and a valve port opening adjacent thereto has a first resistance value, and for at least one other pairing of an actuator opening and an inflow or outflow opening opposite which this actuator opening is situated in an actuator position, a difference between the cross-sectional area of this actuator opening and the cross-sectional area of this inflow or outflow opening has a different difference value, which is greater than the first difference value, and a flow resistance between this inflow or outflow opening and a valve port opening adjacent thereto has a different resistance value, which is greater than the first resistance value.

According to one aspect of the present invention, a valve port opening which is adjacent to an inflow opening is a valve port opening which is the next one or the previous one upstream of this inflow opening, and/or a valve port opening which is adjacent to an outflow opening is a valve port opening, which is the next one or the subsequent one downstream of this outflow opening.

According to one aspect of the present invention, a or the higher flow resistance between an inflow or outflow opening and the adjacent valve port opening can be compensated at least partly by the larger cross-sectional area enlargement from the inflow opening to the actuator opening situated opposite thereto or from the actuator opening to the outflow opening situated opposite thereto, in particular by correspondingly stronger swirling or suction, and thus leakage between inflow and outflow openings can be homogenized even in the case of different flow resistances. According to one aspect of the present invention, by way of corresponding dimensioning of the cross-sectional areas/enlargements, the fluid valve is balanced in such a way that despite different flow resistances, leakage through a gap between cavity and actuator is constant.

The designation "first" does not imply that there also has to be at least one "second" corresponding feature or element.

According to one aspect of the present invention, the fluid flows through the fluid valve from the or one or more of the inflow opening(s) to the or one or more of the outflow opening(s) through the actuator, or the inflow opening(s) is an/are inflow opening(s) of the (inner) lateral surface of the cavity to the actuator and/or is/are (arranged) upstream of the actuator and/or the outflow opening(s), and/or the outflow opening(s) is an/are outflow opening(s), supplied from the actuator, of the (inner) lateral surface of the cavity and/or is/are (arranged) downstream of the inflow opening(s) and/or the actuator, or the fluid valve is provided, in particular configured, for this purpose, or is used for this purpose.

BRIEF DESCRIPTION OF THE DRAWINGS

Further advantages and features emerge from the dependent claims and the exemplary embodiments. In this respect, in part schematically:

DETAILED DESCRIPTION OF THE PRESENTLY PREFERRED EMBODIMENTS

Figure 1:
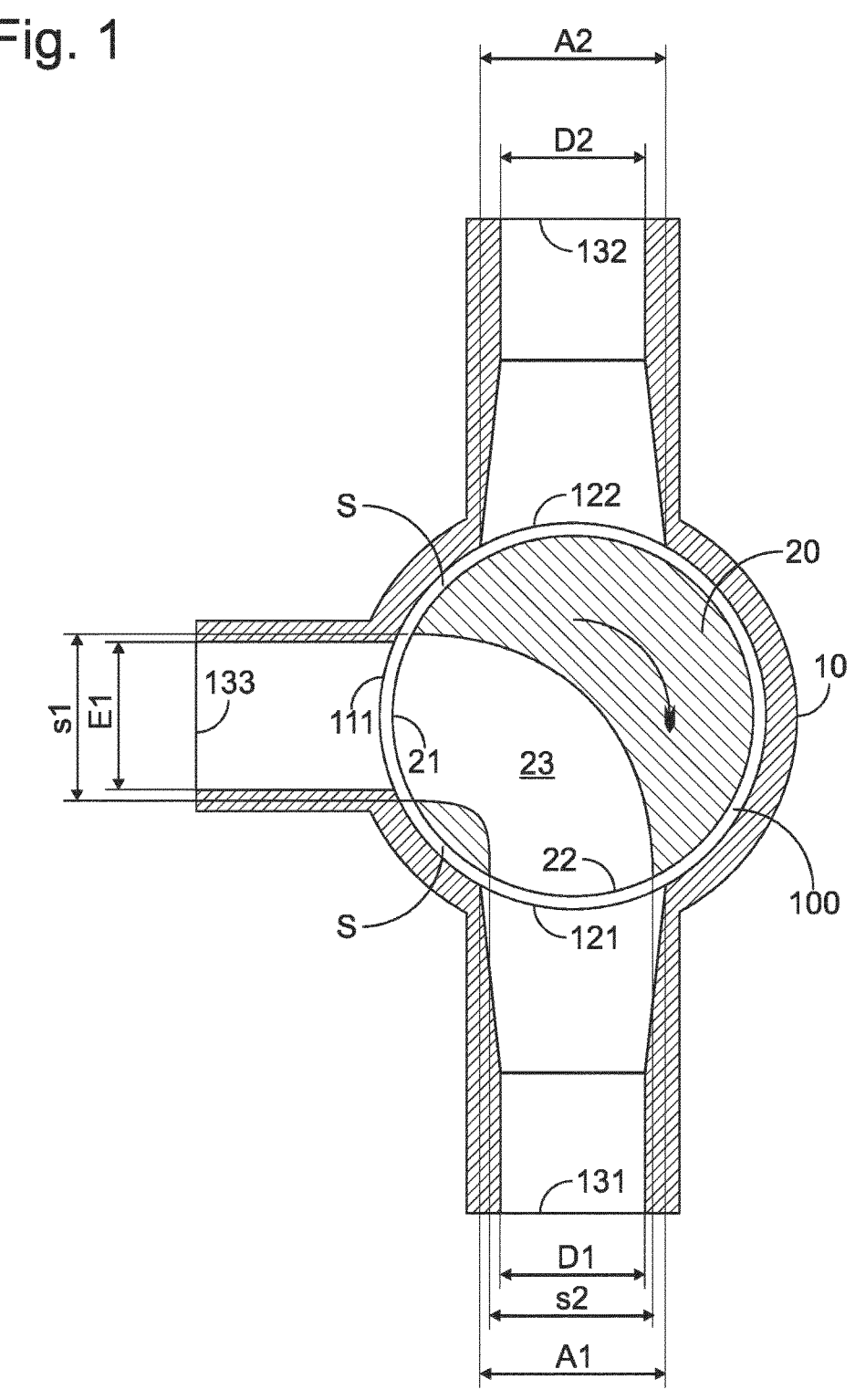
FIG. 1 is a fluid valve in a section transverse to an axis of rotation of the actuator thereof.

FIG. 1 shows a fluid valve according to one aspect of the present invention, having a housing 10 with a cavity 100 in which an actuator 20 is accommodated in a manner rotatable about an axis of rotation which is perpendicular to the plane of the drawing in FIG. 1.

The cavity 100, or the inner lateral surface thereof, has a first inflow opening 111, whose cross-sectional area is indicated in FIG. 1 by its diameter E1, a first outflow opening 121, whose cross-sectional area is indicated in FIG. 1 by its diameter A1, and a second outflow opening 122, whose cross-sectional area is indicated in FIG. 1 by its diameter A2.

The actuator 20, or the outer lateral surface thereof, has a first actuator opening 21, whose cross-sectional area is indicated in FIG. 1 by its diameter s1, and a second actuator opening 22 of a through-passage 23, wherein a cross-sectional area of the second actuator opening 22 is indicated in FIG. 1 by its diameter s2.

In the actuator position shown in FIG. 1, the first actuator opening 21 is situated opposite the first inflow opening 111 and the second actuator opening 22 is situated opposite the first outflow opening 121.

Figure 2:
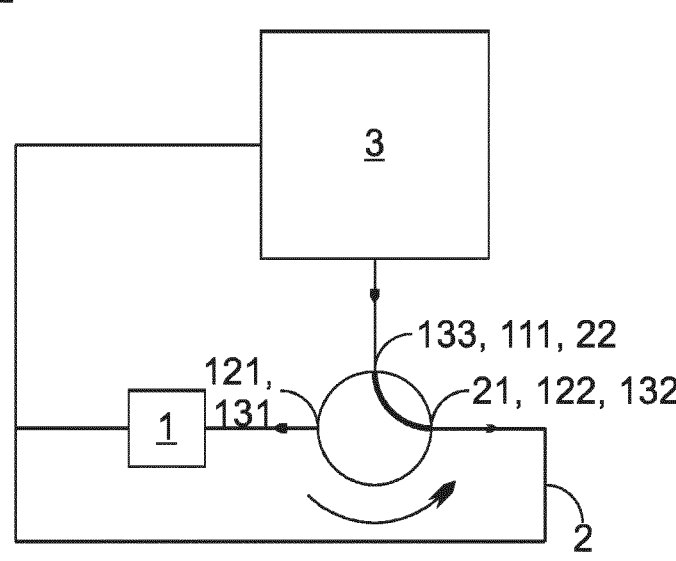
FIG. 2 is a fluid system with the fluid valve.

In an actuator position rotated through 90° in relation thereto, which is shown in FIG. 2, the first actuator opening 21 is situated opposite not the first inflow opening 111 but the second outflow opening 122 and the second actuator opening 22 is situated opposite not the first outflow opening 121 but the first inflow opening 111.

In this way, in the fluid system shown in FIG. 2, fluid can be conducted back to a cooling device 3 by way of a bypass 2 instead of by way of a cooler 1.

In the exemplary embodiment, the cross-sectional areas of the first and second actuator openings 21, 22 are equal (s1=s2) and are (in each case) greater than the cross-sectional area of the first inflow opening 111 (s1>E1 and s2>E1), respectively.

In the exemplary embodiment, the cross-sectional areas of the first and second outflow openings 121, 122 are equal (A1=A2) and are (in each case) greater than the cross-sectional areas of the first and second actuator openings 21, 22 (A1>s1 and A2>s1 and A1>s2 and A2>s2, respectively).

In FIG. 1, the diameter D1 indicates the cross-sectional area of a valve port opening 131 which is adjacent to the first outflow opening 121, and the diameter D2 indicates the cross-sectional area of a valve port opening 132, which is adjacent to the second outflow opening 122. The cross-sectional areas of the two valve port openings 131, 132 and the cross-sectional area of the first inflow opening 111 are equal (D1=D2=E1) in the exemplary embodiment, wherein the cross-sectional area between the first inflow opening 111 and a valve port opening 133 which is adjacent thereto is constant in the exemplary embodiment.

The narrowing A1→D1 or A2→D2 gives rise to a flow resistance which is increased in comparison with that for the constant cross-sectional area between valve port opening 133 and first inflow opening 111. In order to compensate for this, the difference between the cross-sectional areas of the outflow openings 121, 122 and the cross-sectional areas of the actuator openings 21, 22 is correspondingly greater than the difference between the cross-sectional area of the inflow opening 111 and the cross-sectional areas of the actuator openings 21, 22.

The above-explained cross-sectional enlargements (cf. E1→s1/s2→A1/A2) result in the generation of swirling and, in this way, suction from the inflow opening into the actuator opening situated opposite thereto and from the actuator opening into the outflow opening situated opposite thereto. Consequently, the gap S between the first inflow opening and the first and second outflow openings can be formed in a contact seal-free manner.

As can be seen from the figure sequence FIG. 1⇆FIG. 2, the fluid valve or the actuator thereof can be switched into the position shown in FIG. 1, in which the first actuator opening 21 is situated opposite the first inflow opening 111 and the second actuator opening 22 is situated opposite the first outflow opening 121 and fluid flows from the cooling device 3 into the valve port opening 133, from the first inflow opening 111 into the first actuator opening 21, through the through-passage 23, from the second actuator opening 22 into the first outflow opening 121, and from the valve port opening 131 back to the cooling device 3 via the cooler 1, and into the position shown in FIG. 2, in which the second actuator opening 22 is situated opposite the first inflow opening 111 and the first actuator opening 21 is situated opposite the second outflow opening 122 and fluid flows from the cooling device 3 into the valve port opening 133, from the first inflow opening 111 into the second actuator opening 22, through the through-passage 23, from the first actuator opening 21 into the second outflow opening 122, and from the valve port opening 132 back to the cooling device 3 via the bypass 2.

Figure 3:
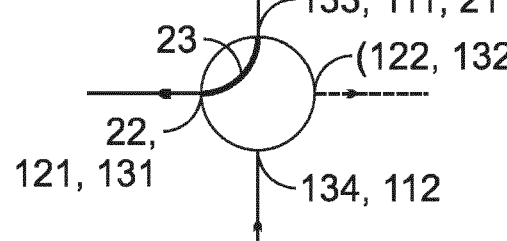
FIG. 3 is a fluid valve in an actuator position.
Figure 4:
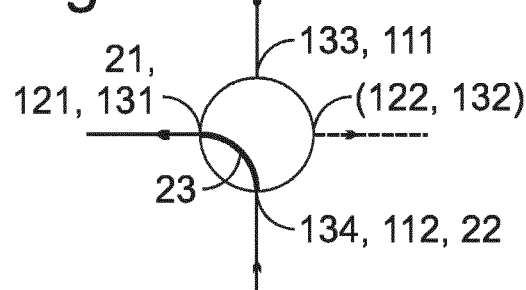
FIG. 4 is the fluid valve in FIG. 3 in a different actuator position.

FIGS. 3 and 4 show, in an illustration corresponding to FIG. 2, a fluid valve according to a further aspect of the present invention in an actuator position. Here, features corresponding to one another are identified by identical reference signs, so that reference is made to the above description and only differences are discussed below.

In FIGS. 3 and 4, the fluid valve has a second inflow opening 112 and a valve port opening 134 which is adjacent thereto, such that it is selectively possible for the first and possibly second outflow opening 121, 122 to be supplied from the first or second inflow opening 111, 112.

Figure 5:
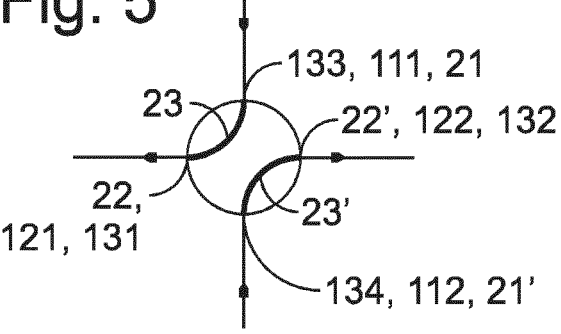
FIG. 5 is a fluid valve in an actuator position.
Figure 6:
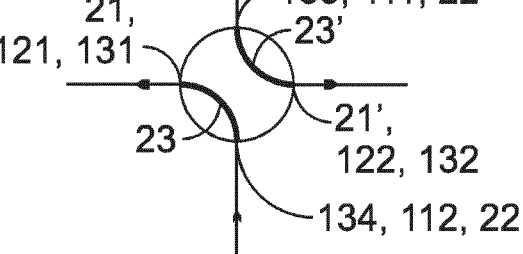
FIG. 6 is the fluid valve in FIG. 5 in a different actuator position.

FIGS. 5 and 6 show, in an illustration corresponding to FIGS. 3 and 4, a fluid valve according to the present invention in an actuator position. Here, features corresponding to one another are identified by identical reference signs, so that reference is made to the above description and only differences are discussed below.

In FIGS. 5 and 6, the fluid valve has a further through-passage 23' with a first further actuator opening 21' and with a second further actuator opening 22', such that it is selectively possible for one of the first and second outflow openings 121, 122 to be supplied from one of the first and second inflow openings 111, 112 and at the same time for the other of the first and second outflow openings 121, 122 to be supplied from the other of the first and second inflow openings 111, 112.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for implementing at least one exemplary embodiment, wherein various changes, in particular with regard to the function and arrangement of the component parts described, may be made without departing from the scope of protection as apparent from the claims and combinations of features equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fluid valve, comprising:
a housing having:
  a first valve port opening; and
  a second valve port opening;
an actuator having a first lateral cylindrical surface comprising:
  a first actuator opening in the first lateral surface;
  a second actuator opening in the first lateral surface; and
  at least one through-passage between the first actuator opening and the second actuator opening; and
a cavity defined in the housing having a second cylindrical lateral surface directly facing the first lateral surface in which the actuator is moveably accommodated in a movable manner, the cavity comprising:
  a first inflow opening defined in the second cylindrical lateral surface and spaced apart from the first valve port opening; and
  a first outflow opening defined in the second cylindrical lateral surface and spaced apart from the second valve port opening;
in a first actuator position, the first actuator opening is situated opposite the first inflow opening and the second actuator opening is situated opposite the first outflow opening, and
in a second actuator position, the first actuator opening is not situated opposite the first inflow opening and/or the second actuator opening is not situated opposite the first outflow opening;
wherein:
a cross-sectional area of the first actuator opening is greater than a cross-sectional area of the first inflow opening, and
a cross-sectional area of the first outflow opening is greater than a cross-sectional area of the second actuator opening.

2. The fluid valve as claimed in claim 1,
wherein the cavity has a second outflow opening;
wherein,
  in the first actuator position, one of the first and the second actuator openings is situated opposite one of the first and a second inflow opening and the other of the first and the second actuator openings is situated opposite the other of the first and the second outflow openings; and
  in at the second actuator position, the one of the first and the second actuator openings is not situated opposite the one of the first and the second inflow opening and the other of the first and the second actuator openings is not situated opposite the other of the first and the second outflow openings; and
wherein at least one of:
  a cross-sectional area of a respective actuator opening is greater than a cross-sectional area of a respective inflow opening, and a cross-sectional area of the second outflow opening is greater than the cross-sectional area of a respective actuator opening.

3. The fluid valve as claimed in claim 1,
wherein the cavity has a second inflow opening;
wherein:
  in a third actuator position, one of the first and second actuator openings is situated opposite the second inflow opening and the other of the first and second actuator openings is situated opposite one of the first and a second outflow opening; and
  in a fourth actuator position, the one of the first and second actuator opening is not situated opposite the second inflow opening and/or the other of the first and second actuator opening is not situated opposite the first and second outflow opening; and
wherein:
  a cross-sectional area of the second actuator opening is greater than a cross-sectional area of the second inflow opening, and
  a cross-sectional area of a respective outflow opening is greater than the cross-sectional area of a respective other actuator opening.

4. The fluid valve as claimed in claim 1,
wherein the actuator has a second through-passage with a third actuator opening and with a fourth actuator opening;
wherein
  in the first actuator position, the third actuator opening is situated opposite a respective inflow opening and the fourth actuator opening is situated opposite a respective outflow opening, and
  in the second actuator position, the third actuator opening is not situated opposite the respective inflow opening and/or the fourth actuator opening is not situated opposite this outflow opening; and
wherein:
  a cross-sectional area of the third actuator opening is greater than a cross-sectional area of the respective inflow opening, and
  a cross-sectional area of a respective outflow opening is greater than a cross-sectional area of the fourth actuator opening.

5. The fluid valve as claimed in claim 4, wherein at least one of:
  the cross-sectional area of at least one actuator opening of at least one through-passage of the actuator that, in the first actuator position, is situated opposite an inflow opening is greater than the cross-sectional area of this inflow opening; and
  the cross-sectional area of at least one actuator opening of at least one through-passage of the actuator that, in the first actuator position, is situated opposite a respective outflow opening is less than the cross-sectional area of the respective outflow opening.

6. The fluid valve as claimed in claim 4, wherein at least one of:
  the cross-sectional area of each, actuator opening of each through-passage of the actuator that, in the first actuator position, is situated opposite an inflow opening is greater than the cross-sectional area of this inflow opening; and
  the cross-sectional area of each, actuator opening of each through-passage of the actuator that, in at the first actuator position, is situated opposite a respective outflow opening is less than the cross-sectional area of the respective outflow opening.

7. The fluid valve as claimed in claim 1, further comprising:

a contact seal-free gap is arranged between one or more of:

the first and/or a second inflow opening and the first and/or a second outflow opening and/or the first and/or second inflow opening and/or between the first and/or the second outflow opening.

8. The fluid valve as claimed in claim 1, wherein, for a first pairing of a respective actuator opening and a respective inflow or outflow opening opposite which this actuator opening is situated in an actuator position, a difference between the cross-sectional area of this actuator opening and the cross-sectional area of this inflow or outflow opening has a first difference value, and a flow resistance between this inflow or outflow opening and a valve port opening adjacent thereto has a first resistance value; and for at least one other pairing of an actuator opening and an inflow or outflow opening opposite which this actuator opening is situated in an actuator position, a difference between the cross-sectional area of this actuator opening and the cross-sectional area of this inflow or outflow opening has a different difference value, which is greater than the first difference value, and a flow resistance between this inflow or outflow opening and a valve port opening adjacent thereto has a different resistance value, which is greater than the first resistance value.

9. The fluid valve as claimed in claim 1, wherein the cross-sectional area of the first outflow opening is greater than a cross-sectional area of the second valve port opening.

10. The fluid valve as claimed in claim 9, wherein the cross-sectional area of the first inflow opening is equal to a cross-sectional area of the first valve port opening.

11. A fluid system, configured as a temperature-control system, having at least one fluid valve comprising:

a housing having:

a first valve port opening; and a second valve port opening;

an actuator having a first lateral cylindrical surface comprising:

a first actuator opening in the first lateral surface;

a second actuator opening in the first lateral surface; and at least one through-passage between the first actuator opening and the second actuator opening;

a cavity defined in the housing having a second cylindrical lateral surface directly facing the first lateral surface in which the actuator is moveably accommodated in a movable manner, the cavity comprising:

a first inflow opening defined in the second cylindrical lateral surface and spaced apart from the first valve port opening; and a first outflow opening defined in the second cylindrical lateral surface and spaced apart from the second valve port opening;

in a first actuator position, the first actuator opening is situated opposite the first inflow opening and the second actuator opening is situated opposite the first outflow opening, and in a second actuator position, the first actuator opening is not situated opposite the first inflow opening and/or the second actuator opening is not situated opposite the first outflow opening;

wherein:

a cross-sectional area of the first actuator opening is greater than a cross-sectional area of the first inflow opening, and a cross-sectional area of the first outflow opening is greater than a cross-sectional area of the second actuator opening.

12. A motor vehicle comprising:

a fluid system having at least one fluid valve comprising:

a housing having:

a first valve port opening; and a second valve port opening;

an actuator having a first lateral cylindrical surface comprising:

a first actuator opening in the first lateral surface;

a second actuator opening in the first lateral surface; and at least one through-passage between the first actuator opening and the second actuator opening; and a cavity defined in the housing having a second cylindrical lateral surface directly facing the first lateral surface in which the actuator is moveably accommodated in a movable manner, the cavity comprising:

a first inflow opening defined in the second cylindrical lateral surface and spaced apart from the first valve port opening; and a first outflow opening defined in the second cylindrical lateral surface and spaced apart from the second valve port opening;

in a first actuator position, the first actuator opening is situated opposite the first inflow opening and the second actuator opening is situated opposite the first outflow opening, and in a second actuator position, the first actuator opening is not situated opposite the first inflow opening and/or the second actuator opening is not situated opposite the first outflow opening;

wherein:

a cross-sectional area of the first actuator opening is greater than a cross-sectional area of the first inflow opening, and a cross-sectional area of the first outflow opening is greater than a cross-sectional area of the second actuator opening.

13. A method for operating a fluid valve, having:

a housing having:

a first valve port opening; and a second valve port opening;

an actuator having a first lateral cylindrical surface comprising:

a first actuator opening in the first lateral surface;

a second actuator opening in the first lateral surface; and at least one through-passage between the first actuator opening and the second actuator opening; and a cavity defined in the housing having a second cylindrical lateral surface directly facing the first lateral surface in which the actuator is moveably accommodated in a movable manner, the cavity comprising:

a first inflow opening defined in the second cylindrical lateral surface and spaced apart from the first valve port opening; and a first outflow opening defined in the second cylindrical lateral surface and spaced apart from the second valve port opening;

in a first actuator position, the first actuator opening is situated opposite the first inflow opening and the second actuator opening is situated opposite the first outflow opening, and in a second actuator position, the first actuator opening is not situated opposite the first inflow opening and/or the second actuator opening is not situated opposite the first outflow opening;

wherein:

a cross-sectional area of the first actuator opening is greater than a cross-sectional area of the first inflow opening, and a cross-sectional area of the first outflow opening is greater than a cross-sectional area of the second actuator opening, the method comprising:

situating the first actuator opening opposite the first inflow opening;

situating the second actuator opening opposite the first outflow opening; and fluid flows from the first inflow opening into the first actuator opening and from the second actuator opening into the first outflow opening.

* * * * *